(12) United States Patent
Wang et al.

(10) Patent No.: US 10,344,153 B2
(45) Date of Patent: Jul. 9, 2019

(54) POLYPROPYLENE COMPOSITION WITH IMPROVED HOT-TACK FORCE

(71) Applicant: Borealis AG, Vienna (AT)

(72) Inventors: Jingbo Wang, Engerwitzdorf (AT); Carl-Gustaf Ek, Västra Frölunda (SE); Anil Sönmez, Vienna (AT); Klaus Bernreitner, Linz (AT); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/747,539

(22) PCT Filed: May 31, 2016

(86) PCT No.: PCT/EP2016/062268
§ 371 (c)(1),
(2) Date: Jan. 25, 2018

(87) PCT Pub. No.: WO2017/016711
PCT Pub. Date: Feb. 2, 2017

(65) Prior Publication Data
US 2018/0244905 A1    Aug. 30, 2018

(30) Foreign Application Priority Data

Jul. 30, 2015    (EP) .................................... 15179158
Sep. 21, 2015    (EP) .................................... 15185996

(51) Int. Cl.
| | | |
|---|---|---|
| C08L 23/16 | (2006.01) | |
| C08L 23/14 | (2006.01) | |
| C09J 123/14 | (2006.01) | |
| C09J 7/35 | (2018.01) | |
| C08F 2/00 | (2006.01) | |

(52) U.S. Cl.
CPC ............. *C08L 23/142* (2013.01); *C08L 23/16* (2013.01); *C09J 7/35* (2018.01); *C09J 123/142* (2013.01); *C08F 2/001* (2013.01); *C08L 2205/025* (2013.01); *C08L 2207/02* (2013.01); *C08L 2314/02* (2013.01); *C09J 2205/31* (2013.01); *C09J 2423/10* (2013.01)

(58) Field of Classification Search
CPC ...... C09J 123/142; C09J 7/35; C09J 2205/31; C09J 2423/10; C08L 23/142; C08L 23/16; C08L 2207/02; C08L 2314/02; C08F 2/001
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 1/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 5,539,067 A | 7/1996 | Parodi et al. |
| 5,618,771 A | 4/1997 | Parodi et al. |
| 2007/0042193 A1* | 2/2007 | Wang .................. B32B 7/12 428/423.1 |
| 2016/0145366 A1* | 5/2016 | Wang ................ C08F 210/06 526/66 |

FOREIGN PATENT DOCUMENTS

| | | |
|---|---|---|
| EP | 0 045 975 | 8/1981 |
| EP | 0 045 976 | 8/1981 |
| EP | 0 045 977 | 8/1981 |
| EP | 1 484 345 | 8/2004 |
| EP | 0 887 379 | 12/2004 |
| EP | 2 610 271 | 7/2013 |
| WO | 87/07620 | 12/1987 |
| WO | 92/12182 | 7/1992 |
| WO | 92/19563 | 11/1992 |
| WO | 92/19658 | 11/1992 |
| WO | 92/19659 | 11/1992 |
| WO | 92/21705 | 12/1992 |
| WO | 93/11165 | 6/1993 |
| WO | 93/11166 | 6/1993 |

(Continued)

OTHER PUBLICATIONS

Busico, et al., "Microstructure of polypropylene," Progress in Polymer Science, vol. 26, 2001, pp. 443-533, Elsevier.

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134, Wiley InterScience.

Busico, et al., "Full Assignment of the 13C NMR Spectra of Regioregular Polypropylenes: Methyl and Methylene Region," Macromolecules, vol. 30, 1997, pp. 6251-6263, American Chemical Society.

Cheng, H.N., "C NMR Analysis of Ethylene-Propylene Rubbers," Macromolecules, vol. 17, 1984, pp. 1950-1955, American Chemical Society.

Kakugo, et al., "C NMR Determination of Monomer Sequence Distribution in Ethylene-Propylene Copolymers Prepared with s-TiCL 13-AL (C2H5)2C1," Macromolecules, vol. 15, 1982, pp. 1150-1152, American Chemical Society.

(Continued)

*Primary Examiner* — Nathan M Nutter
(74) *Attorney, Agent, or Firm* — Lowenstein Sandler LLP (57) ABSTRACT

The invention relates to a polypropylene composition comprising a crystalline propylene random copolymer and an amorphous propylene copolymer having improved hot-tack force and adhesion properties, to a process for the manufacture thereof, to the use thereof in the manufacture of adhesives and hot tack films and to articles comprising the polypropylene composition, as well as to a process for producing such article.

20 Claims, 1 Drawing Sheet

(56) References Cited

FOREIGN PATENT DOCUMENTS

| | | | |
|---|---|---|---|
| WO | 93/19100 | 9/1993 | |
| WO | 95/32994 | 12/1995 | |
| WO | 97/36939 | 10/1997 | |
| WO | 98/12234 | 3/1998 | |
| WO | 99/24478 | 5/1999 | |
| WO | 99/24479 | 5/1999 | |
| WO | 99/33842 | 7/1999 | |
| WO | 00/68315 | 11/2000 | |
| WO | 03/000754 | 1/2003 | |
| WO | 03/000755 | 1/2003 | |
| WO | 03/000756 | 1/2003 | |
| WO | 03/000757 | 1/2003 | |
| WO | 2004/000899 | 12/2003 | |
| WO | 2004/029112 | 4/2004 | |
| WO | 2004/111095 | 12/2004 | |
| WO | 2010/009827 | 1/2010 | |
| WO | 2011/064119 | 6/2011 | |
| WO | 2012/007430 | 1/2012 | |
| WO | 2012/051239 | 4/2012 | |
| WO | 2012/093098 | 7/2012 | |
| WO | 2014/014491 | 1/2014 | |
| WO | 2014/206950 | 12/2014 | |
| WO | WO-2014206950 A1 * | 12/2014 | ............. C08F 10/00 |

OTHER PUBLICATIONS

Randall, J. et al., "A Review of High Resolution Liquid 13Carbon Nuclear Magnetic Resonance Characterizations of Ethylene-Based Polymers," Rev. Macromol. Chem. Phys. 1989, C29, 201.

Resconi, et al., "Selectivity in Propene Polymerization with Metallocene Catalysts," Chem. Rev., vol. 100, 2000, pp. 1253-1345, American Chemical Society.

Singh, et al., Triad Sequence Determination of Ethylene-Propylene Copolymers—Application of Quantitative 13C NMR, Polymer Testing, 29, 2009, pp. 475-479.

Wang, et al., "Structural Analysis of Ethylene/Propylene Copolymers Synthesized with a Constrained Geometry Catalyst," Macromolecules, vol. 33, 2000, pp. 1157-1162, American Chemical Society.

Zhou, et al., "A new decoupling method for accurate quantification of polyethylene copolymer composition and triad sequence distribution with 13C NMR," Journal of Magnetic Resonance, vol. 187, 2007, pp. 225-233, Elsevier.

Notification of Transmittal of the International Search report and the Written Opinion of the International Searching Authority, or the Declaration for Application No. PCT/EP2016/062268, dated Aug. 26, 2016, 11 pgs.

* cited by examiner

POLYPROPYLENE COMPOSITION WITH IMPROVED HOT-TACK FORCE

CROSS-REFERENCE TO RELATED APPLICATION(S)

This application is a national phase of International Application No. PCT/EP2016/062268, filed on May 31, 2016, which claims the benefit of European Patent Application No. 15179158.9, filed on Jul. 30, 2015 and of European Patent Application No. 15185996.4, filed on Sep. 21, 2015. The contents of these applications are hereby incorporated by reference in their entirety.

The present invention relates to a polypropylene composition useful in the preparation of heat-sealable films and hot melt adhesives. The invention also relates to a process for the manufacture of the polypropylene composition, to the use of the composition in hot-tack film and adhesives, to articles, in particular films and adhesives comprising the polypropylene composition and processes for the manufacture thereof.

In the packaging field it is often desirable to coat an article, substrate or film in order to provide hot-seal properties. A particular desirable coating is that of a heat-sealable film which is capable of being bonded to itself, to another film or to another substrate with the application of heat and/or pressure. In this manner the article, substrate or film can be sealed to form structures such as bags or other packaging materials. Particularly demanding applications of films, like form and fill packaging require, besides other properties like low seal initiation temperature, good hot-tack properties. Hot-tack is the bonding strength measurable while the polymer in the heat sealed portion of a film is in a semi-molten/solidifying state. This bonding strength is expressed here and hereafter in the hot tack force (N) needed to tear apart sealed layers comprising the composition of the invention and which is measured as described in the experimental section below.

Laminates and single or multilayer films having a heat-sealable layer are often used in form and fill packaging machines. These machines create from the film a continuous stream of packages that are capable of being closed by film-to-film seals. Such packages are generally produced in a process that simultaneously heat seal the bottom of the package and fills it while it is in a vertical or horizontal position. Thus the heat sealing, while still in the semi-molten/solidifying state, must be able to withstand the weight of a product introduced in the package and generally also to withstand a pressure of air generally used to assist in transport of the product. The hot-tack is generally an important factor to improve the efficiency of a packaging production process.

In the polyolefin film field, the properties of a specific type of film come generally from the polyolefin composition comprised in such film. Thus there is a general need of a polyolefin composition having good hot-tack properties.

The hot-tack property is also important in other applications where hot-melt adhesives are used. Hot-melt adhesives are used in applications like for example production of disposable diapers and sanitary napkins, packaging, case and carton sealing, bookbinding, bottle labelling, woodworking, textile and pressure sensitive application.

WO2011064119 discloses polyolefin compositions useful in the preparation of heat-sealable films, containing propylene copolymers and other polyolefin components, in particular polyolefin compositions comprising, all percentages being by weight:

a) from 60 to 94% of one or more copolymers of propylene with one or more comonomers selected from ethylene, a $C_4$-$C_8$ alpha-olefin and combinations thereof, where the comonomer, or comonomers, content in (A) is from 5 to 25%, preferably from 7 to 20%; This could be:

b) from 2 to 20% of one or more homo or copolymers of butene-1;

c) from 1 to 20% of an elastomeric or plastomeric polyolefin or polyolefin composition.

The polymerized comonomers are statistically distributed in the resulting copolymer. A balance of heat-sealability (very low Seal initiation temperature), hot tack and optical properties (in particular a low Haze) is obtained by blending a major amount of specific propylene copolymers with a butene-1 polymer and an elastomeric or plastomeric polyolefin or polyolefin composition.

A disadvantage of the composition of WO2011064119 is that the hot-tack is achieved with at least 3 components in the composition and that butene is required as comonomer in the polyolefin compositions which is disadvantageous in view of recycling purposes. The object of the invention to solve one or more of the mentioned problems, in particular to provide a simpler composition and a composition that is better recyclable with good hot tack properties for use in a hot tack film and with good hot melt adhesion properties for hot melt adhesive applications.

DETAILED DESCRIPTION

Figure 1:
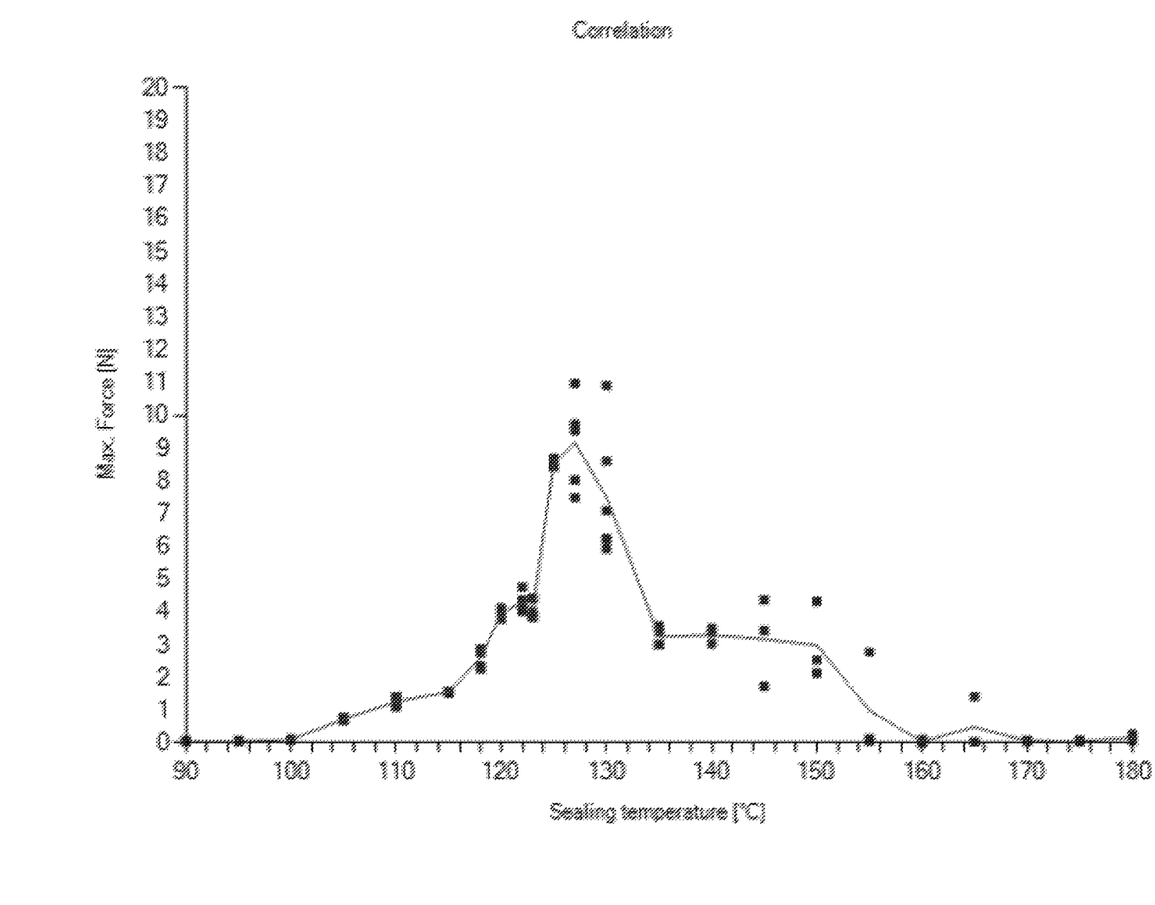
The FIGURE shows a plot of hot tack force measured as a function of temperature for specimens prepared in accordance with the disclosure.

According to the invention one or more of the above mentioned problems have been solved by providing a polypropylene composition comprising:

a) 55.0 to 90.0 wt % of a crystalline propylene random copolymer (C-PP) comprising propylene monomers and 1.0 to 6.5 wt % of at least one comonomer selected from ethylene and a $C_4$-$C_{12}$ alpha-olefin, having a melting temperature in the range of 135 to 155° C. as measured according to ISO 11357-3 and a melt flow rate ($MFR_2$) in the range of 0.1 to 15 g/10 min as measured according to ISO 1133 at a temperature of 230° C. and under a load of 2.16 kg and b) 10.0 to 45.0 wt % of an amorphous propylene copolymer (AM-PP) comprising propylene monomers and 30.0 to 50.0 wt % of at least one comonomer selected from ethylene and a $C_4$-$C_{12}$ alpha-olefin and having a glass transition temperature Tg(b) in the range of −60 to −40° C., the wt % of the C-PP and AM-PP copolymers being relative to the total weight of the C-PP and AM-PP copolymers, said polypropylene composition having a melt flow rate ($MFR_2$) in the range of 0.3 to 90 g/10 min as measured according to ISO 1133 at a temperature of 230° C. and under a load of 2.16 kg and also having a relative content of isolated to block comonomer sequences I(E) in the range of 20 to 50%, which is calculated according to the equation:

$$I(E) = fPEP/((fEEE + fPEE + fPEP)) \times 100 \qquad (1)$$

wherein
I(E) is the relative content of isolated to block comonomer sequences [in %];
fPEP is the mol fraction of propylene/comonomer/propylene sequences (PEP) in the sample;
fPEE is the mol fraction of propylene/comonomer/comonomer sequences (PEE) and of comonomer/comonomer/propylene sequences (EEP) in the sample;
fEEE is the mol fraction of comonomer/comonomer/comonomer sequences (EEE) in the sample wherein all sequence concentrations being based on a statistical triad analysis of $^{13}$C-NMR data. The comonomer sequence distribution at the triad analysis of $^{13}$C-NMR data can be determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted as described in the experimental section to increase applicability to a wider range of comonomer contents. It is noted that here and hereafter the lower and upper indicated values of any ranges are included in the range.

Ethylene is the preferred comonomer, so accordingly in the polypropylene composition at least 50, more preferably at least 70, 80, 90 or even 95 wt % of the comonomers in the crystalline propylene random copolymer (C-PP) and in the amorphous propylene copolymer (AM-PP) are ethylene comonomers. In case comonomers other than ethylene are used preferably the comonomers are only ethylene and butylene. Most preferably substantially 100 wt % of the comonomers are ethylene comonomers.

The polypropylene composition according to the invention comprise a matrix (M) of the crystalline propylene random copolymer (C-PP) and dispersed therein inclusions comprising the amorphous propylene copolymer (AM-PP). The term inclusion indicates that the matrix (M) and the inclusion form different phases within the polypropylene composition.

The invention relates in particular to a polypropylene composition that comprises as polymer components only the crystalline propylene random copolymer (C-PP) and the amorphous propylene copolymer (AM-PP) and preferably substantially consists of C-PP and AM-PP copolymer. This is the product that is produced and sold for use in particular in hot tack films or hot melt adhesives, for which envisaged use other components are added to the copolymer composition as described below. It is considered that a minor amount of polyethylene can be formed as a reaction by-product during the preparation of the crystalline propylene random copolymer (C-PP) and the amorphous propylene copolymer (AM-PP). Such minor amount of polyethylene formed during this reaction is considered to be part of the polypropylene composition consisting of C-PP and AM-PP.

Processes for the production of crystalline propylene random copolymer (C-PP) and of amorphous propylene copolymer (AM-PP) are in general known in the art. The specific conditions are chosen in view the specified features of the polypropylene composition according to the invention as described below. Generally a polymerisation catalyst is present in the polymerisation process. The polymerisation catalyst is generally a Ziegler-Natta catalysts. Preferably, the Ziegler-Natta type catalyst is a stereospecific, solid, high yield catalyst component comprising as main components Mg, Ti and Cl. It is preferred that, in addition to the solid catalyst component, at least one co-catalyst as well as at least one external donor are used in the polymerisation process.

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

The solid catalyst usually also comprises at least one electron donor (internal electron donor) and optionally aluminum. Suitable external electron donors used in the polymerisation process are well known in the art and include ethers, ketones, amines, alcohols, phenols, phosphines and silanes.

Examples of suitable Ziegler-Natta catalysts and components in the catalysts are described among others in WO87/07620, WO92/21705, WO93/11165, WO93/11166, WO93/19100, WO97/36939, WO98/12234, WO99/33842, WO03/000756, WO03/000757, WO03/000754, WO03/000755, WO2004/029112, EP2610271, WO2012/007430, WO92/19659, WO92/19653, WO92/19658, U.S. Pat. Nos. 4,382,019, 4,435,550, 4,465,782, 4,473,660, 4,560,671, 5,539,067, 5,618,771, EP45975, EP45976, EP45977, WO95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882. Preferred Ziegler-Natta catalysts and components in the catalysts are described in WO2010009827.

The crystalline propylene random copolymer (C-PP) and the amorphous propylene copolymer (AM-PP) comprised in the polypropylene composition according to the invention may be produced in separate polymerisation processes and then mixed eg. in a mixing device, preferably a melt mixing device like an extruder. More preferably they are produced in a continuous or semi-continuous polymerisation process in subsequent steps like in series or in cascade connected reactors. Suitably and preferably such continuous polymerisation process comprises at least three reactor stages, like for example one bulk reactor stage (for example a loop reactor), a $1^{st}$ gas-phase stage and a $2^{nd}$ gas-phase reactor stage an optionally a pre-reactor stage. The advantage of this process is that it results in a better compatibility of the components and to a more homogeneous product.

The polymerisation generally comprises at least one polymerisation stage and at each stage can be carried out in solution, slurry, fluidized bed, bulk or gas phase. In one particular embodiment the polymerisation process contains at least one bulk reactor stage and at least one gas phase reactor stage, each stage comprising at least one reactor and all reactors being arranged in cascade. In one particularly preferred embodiment the polymerisation process comprises at least one bulk reactor and at least one gas phase reactor arranged in that order. In some further preferred embodiments the polymerisation processes comprises one bulk reactor and at least two gas phase reactors, e.g. two or three gas phase reactors. The polymerisation process may further comprise pre- and post-reactor stages. Pre-reactor stages comprise typically pre-polymerisation reactors. In this kind of polymerisation processes high polymerisation temperatures are generally used in order to achieve specific properties of the resulting propylene copolymers. Typical temperatures in the processes are 60° C. or higher, preferably 80° C. or higher, more preferably 85° C. or higher. The high polymerisation temperatures as mentioned above can be applied either in some or all reactors of the reactor cascade.

A preferred polymerisation process is a "loop-gas phase"-process, such as developed by Borealis and known as BORSTAR™ technology. Examples of this polymerisation process are described in EP0887379, WO92/12182, WO2004/000899, WO2004/111095, WO99/24478, WO99/24479 and WO00/68315. A further preferred polymerisation process is the slurry-gas phase process called Spheripol™ process.

The invention hence also relates to a most preferred process for the manufacture of the polypropylene composition according to the invention and the polypropylene composition obtainable by the process according to the invention, said process comprising the steps:
a) in a pre-polymerisation reactor propylene is pre-polymerised in the presence of a Ziegler-Natta catalyst, a co-catalyst and an external donor, obtaining a reaction mixture (RM-1) comprising a polypropylene (Pre-PP),
b) transferring the reaction mixture (RM-1) to a loop reactor,
c) in the loop reactor propylene and at least one comonomer selected from ethylene and a $C_4$-$C_{12}$ alpha-olefin, preferably propylene and ethylene are polymerised in the presence of the reaction mixture (RM-1), obtaining a reaction mixture (RM-2),
d) transferring the reaction mixture (RM-2) to a gas-phase reactor-1,
e) in the gas-phase reactor-1 propylene and at least one comonomer selected from ethylene and a $C_4$-$C_{12}$ alpha-olefin, preferably propylene and ethylene are polymerised, obtaining a reaction mixture (RM-3) comprising the crystalline propylene random copolymer (C-PP) according to the invention,
f) transferring the reaction mixture (RM-3) to a gas-phase reactor-2,
g) in the gas-phase reactor-2 propylene and at least one comonomer selected from ethylene and a $C_4$-$C_{12}$ alpha-olefin, preferably propylene and ethylene are polymerised, obtaining a reaction mixture (RM-4) comprising the crystalline propylene random copolymer (C-PP) and the amorphous propylene copolymer (AM-PP) according to the invention,
h) recovering the polypropylene composition according to the invention.

In view of achieving the isolated to block content feature I(E), the process preferably uses:
a) a Ziegler Natta based catalyst comprising a group 2 metal and a group 6 metal containing catalyst which comprises an internal electron donor, triethylaluminium (TEAL) as co-catalyst and di-cyclopentyldimethoxy silane as external donor (donor D),
b) a hydrogen/propylene ($H_2/C_3$) ratio in the loop reactor in the range of 0.1 to 0.4 mol/kmol,
c) a hydrogen/propylene ($H_2/C_3$) ratio in the gas-phase reactor-1 in the range of 2.5 to 27.0 mol/kmol,
d) a hydrogen/propylene ($H_2/C_3$) ratio in the gas-phase reactor-2 in the range of 60 to 270 mol/kmol and
e) an ethylene/propylene ($C_2/C_3$) ratio in the loop reactor in the range of 0.0 to 25 mol/kmol, preferably in the range of 1-10 mol/kmol, more preferably in the range of 2-8 mol/kmol.
f) an ethylene/propylene (C2/C3) ratio in the gas-phase reactor-1 in the range of 25.0 to 50.0 mol/kmol, preferably in the range of 27.0 to 45.0 mol/kmol
g) an ethylene/propylene (C2/C3) ratio in the gas-phase reactor-2 in the range of 500 to 600 mol/kmol, preferably in the range of 510 to 580 mol/kmol.

In the process the conditions and relative amounts of monomers and relative amounts of intermediate products formed are chosen such as to arrive at the polypropylene composition comprising:
a) 55.0 to 90.0 wt % of a crystalline propylene random copolymer (C-PP) comprising propylene monomers and 1.0 to 6.5 wt % of at least one comonomer selected from ethylene and a $C_4$-$C_{12}$ alpha-olefin, having a melting temperature in the range of 135 to 155° C. as measured according to ISO 11357-3 and a melt flow rate ($MFR_2$) in the range of 0.1 to 15 g/10 min as measured according to ISO 1133 at a temperature of 230° C. and under a load of 2.16 kg and
b) 10.0 to 45.0 wt % of an amorphous propylene copolymer (AM-PP) comprising propylene monomers and 30.0 to 50.0 wt % of at least one comonomer selected from ethylene and a $C_4$-$C_{12}$ alpha-olefin and having a glass transition temperature Tg(b) in the range of −60 to −40° C., the amount of crystalline propylene random copolymer and of amorphous propylene copolymer comprised in the polypropylene composition being calculated based on the total amount of the polypropylene composition,
said polypropylene composition having a melt flow rate ($MFR_2$) in the range of 0.3 to 90 g/10 min as measured according to ISO 1133 at a temperature of 230° C.

The Ziegler-Natta catalyst system, which is used in the preferred production of the polypropylene composition according to the invention, is a Ziegler-Natta based catalyst comprising a group 2 metal and a group 6 metal-containing catalyst which comprises an internal electron donor. The catalyst system further comprises a co-catalyst including an aluminium alkyl compound; and an external electron donor including a silane compound. Specific examples of catalyst systems usable according to the present invention are disclosed e.g. in WO03000754 and EP1484345, which are incorporated herein by reference. In a more preferred embodiment the catalyst is a Ziegler-Natta based catalyst comprising triethylaluminium (TEAL) as co-catalyst and di-cyclopentyldimethoxy silane as external donor (donor D).

The preferred sequential polymerisation process comprising at least three reactor stages, like for example one bulk reactor stage (loop reactor), a $1^{st}$ gas-phase stage and a $2^{nd}$ gas-phase reactor stage an optionally a pre-reactor stage is described in detail in the examples and the abbreviations herein described are the abbreviations used in Examples Table 2. The term "sequential polymerisation process" indicates that the polypropylene composition is produced in at least three reactors connected in series. Accordingly, the crystalline propylene random copolymer (C-PP) is preferably produced in the bulk reactor stage and in the $1^{st}$ gas-phase reactor stage (GPR1) and subsequently transferred into the $2^{nd}$ gas-phase reactor stage (GPR2). In the $2^{nd}$ gas-phase reactor stage the amorphous propylene copolymer (AM-PP) is produced in the presence of the crystalline propylene random copolymer (C-PP). Bulk means a polymerisation in a reaction medium that comprises at least 60 wt % monomer. Accordingly, the bulk reactor stage is carried out in a loop reactor (Loop).

If desired, prior to the bulk reactor stage an optionally pre-reactor stage is placed. The pre-reactor stage takes place in a pre-polymerisation reactor (PRE-POL) wherein a pre-polymerisation of propylene is conducted. In the optionally pre-reactor stage a reaction mixture (RM-1) comprising a polypropylene (Pre-PP) is produced. The pre-polymerisation is conducted in the presence of the Ziegler-Natta catalyst.

The Ziegler-Natta catalyst the co-catalyst and the external donor are all introduced in the pre-polymerisation reactor. However, this shall not exclude the option that at a later stage for instance further co-catalyst and/or external donor is added in the polymerisation process, for instance in the loop reactor. The operating temperature in the pre-polymerisation reactor is in the range of 0.0 to 60° C., preferably in the range of 15 to 50° C., more preferably in the range of 20 to 45° C. The pressure in the pre-polymerisation reactor is not critical but must be sufficiently high to maintain the reaction mixture in liquid phase. Thus, the pressure in the pre-polymerisation reactor may be in the range of 20 to 100 bar, preferably in the range of 30 to 70 bar. Hydrogen can be added in the pre-polymerisation reactor in order to control the molecular weight of the polypropylene (Pre-PP).

In the loop reactor (Loop) a monomer feed comprised of propylene and at least one comonomer selected from ethylene and a $C_4$-$C_{12}$ alpha-olefin is fed and in case the optionally pre-reactor stage is present, together with the optional reaction mixture (RM-1) comprising the polypropylene (Pre-PP) as produced in the pre-reactor stage. In case the optionally pre-reactor stage is not comprised in the sequential polymerisation process, the Ziegler-Natta catalyst, the co-catalyst and the external donor are all introduced in the loop reactor together with a monomer feed comprised of propylene and at least one comonomer selected from ethylene and a $C_4$-$C_{12}$ alpha-olefin. In the loop reactor of the sequential polymerisation process a reaction mixture (RM-2) comprising a propylene copolymer (PP-COP) is produced. The operating temperature in the loop reactor is in the range of 62 to 85° C., preferably in the range of 65 to 82° C., more preferably in the range of 67 to 80° C. Typically the pressure in the loop reactor is in the range of 20 to 80 bar, preferably in the range of 30 to 70 bar, more preferably in the range of 35 to 65 bar. Hydrogen can be added in the loop reactor in order to control the molecular weight, i.e., the melt flow rate $MFR_2$ of the propylene copolymer (PP-COP) comprised in the reaction mixture (RM-2). Generally the hydrogen/propylene ($H_2$/$C_3$) ratio in the in the loop reactor is in the range of 0.1 to 0.4 mol/kmol, preferably in the range of 0.15 to 0.38 mol/kmol, more preferably in the range of 0.17 to 0.36 mol/kmol. Generally the ethylene/propylene ($C_2$/$C_3$) ratio in the loop reactor is in the range of 0.0 to 25 mol/kmol, preferably in the range of 1-10 mol/kmol, more preferably in the range of 2-8 mol/kmol.

The reaction mixture (RM-2) in the loop reactor is directly fed into the gas-phase reactor-1. By "direct feed" is meant a process wherein the content of the loop reactor is led directly to the next gas-phase reactor stage. Propylene and at least one comonomer selected from ethylene and a $C_4$-$C_{12}$ alpha-olefin are fed to the gas-phase reactor-1. In the gas-phase reactor-1 of the sequential polymerisation process a reaction mixture (RM-3) comprising the crystalline propylene random copolymer (C-PP) is produced. The operating temperature in the gas-phase reactor-1 is in the range of 75 to 95° C., preferably in the range of 78 to 92° C., more preferably in the range of 78 to 88° C. Typically the pressure in the gas-phase reactor-1 is in the range of 5 to 50 bar, preferably in the range of 15 to 40 bar. Hydrogen can be added in the gas-phase reactor-1 in order to control the molecular weight, i.e., the melt flow rate $MFR_2$ of the crystalline propylene random copolymer (C-PP). Generally the hydrogen/propylene ($H_2$/$C_3$) ratio in the gas-phase reactor-1 is in the range of 2.5 to 27.0 mol/kmol, preferably in the range of 3.0 to 26.0 mol/kmol, more preferably in the range of 3.2 to 25.0 mol/kmol. Generally the ethylene/propylene ($C_2$/$C_3$) ratio in the gas-phase reactor-1 is in the range of 25.0 to 50.0 mol/kmol, preferably in the range of 27.0 to 45.0 mol/kmol.

The reaction mixture (RM-3) in the gas-phase reactor-1 is then directly fed into the gas-phase reactor-2. Propylene and at least one comonomer selected from ethylene and a $C_4$-$C_{12}$ alpha-olefin is added into the gas-phase reactor-2. In the gas-phase reactor-2 of the sequential polymerisation process a reaction mixture (RM-4) comprising the crystalline propylene random copolymer (C-PP) and the amorphous propylene copolymer (AM-PP), i.e. comprising the polypropylene composition according to the invention, is produced. The operating temperature in the gas-phase reactor-2 is in the range of 75 to 95° C., preferably in the range of 78 to 92° C., more preferably in the range of 85 to 92° C. Typically the pressure in the gas-phase reactor-2 is in the range of 5 to 50 bar, preferably in the range of 15 to 40 bar. Hydrogen can be added in the gas-phase reactor-2 in order to control the molecular weight, i.e., the melt flow rate $MFR_2$ of the crystalline propylene random copolymer (C-PP) and the amorphous propylene copolymer (AM-PP). Generally the hydrogen/propylene ($H_2$/$C_3$) ratio in the gas-phase reactor-2 is in the range of 60.0 to 270.0 mol/kmol, preferably in the range of 65.0 to 265.0 mol/kmol, more preferably in the range of 68.0 to 261.0 mol/kmol. Generally the ethylene/propylene ($C_2$/$C_3$) ratio in the gas-phase reactor-2 is in the range of 500 to 600 mol/kmol, preferably in the range of 510 to 580 mol/kmol. The precise control of the polymerisation conditions and reaction parameters is within the state of the art.

After the polymerisation in the gas-phase reactor-2 is finished, the polypropylene composition according to the invention is recovered by conventional procedures. The recovered polypropylene composition according to the invention is generally in the form of particles. The resulting polypropylene composition in form of particles may be pelletized in a conventional compounding extruder with various additives such as stabilizers, antioxidants, ultraviolet absorbers, antistatic agents and slipping agents.

The invention also relates to the polypropylene composition obtainable by the above described preferred process according to the invention.

Other compounds can be mixed with the polypropylene composition comprising the crystalline propylene random copolymer (C-PP) and the amorphous propylene copolymer (AM-PP). When the mixing is carried out in an extruder the other compounds can be introduced into the extruder via a side feeder for example. Examples of other compounds that can be blended with the crystalline propylene random copolymer (C-PP) and the amorphous propylene copolymer (AM-PP) for producing the polypropylene composition according to the invention are for example additives such as stabilizers, antioxidants, ultraviolet absorbers, antistatic agents and slipping agents.

The crystalline propylene random copolymer (C-PP) and the amorphous propylene copolymer (AM-PP), comprised in the polypropylene composition according to the invention, generally comprises propylene monomers and at least one comonomer selected from ethylene and $C_4$-$C_{12}$ alpha-olefin, in particular selected from ethylene and $C_4$-$C_8$ alpha-olefin, e.g. 1-butene and/or 1-hexene. Preferably, the crystalline propylene random copolymer (C-PP) and the amorphous propylene copolymer (AM-PP) comprise more preferably consist of, at least one comonomer selected from the group consisting of ethylene, 1-butene and 1-hexene. More preferably, the crystalline propylene random copolymer (C-PP) and the amorphous propylene copolymer (AM- PP) comprise apart from propylene, units derivable from ethylene and/or 1-butene. The preferred comonomer is ethylene and in case other comonomers as described above are present, the ethylene comonomer are preferably the majority of the comonomers. Accordingly, the comonomers in the polypropylene composition then comprise at least 50.0 wt % more preferably at least 60, 70, 80, 90 or even 95 wt % of ethylene comonomers, the amount of ethylene comonomer being calculated based on the total amount of comonomers comprised in the crystalline propylene random copolymer (C-PP) and the amorphous propylene copolymer (AM-PP) comprised in the polypropylene composition. In a most preferred embodiment, the crystalline propylene random copolymer (C-PP) and the amorphous propylene copolymer (AM-PP) comprise units derivable from ethylene and propylene only and preferably the crystalline propylene random copolymer (C-PP) and the amorphous propylene copolymer (AM-PP) contain the same comonomers, preferably ethylene. Accordingly, the amorphous propylene copolymer (AM-PP) is preferably an ethylene propylene rubber (EPR), whereas the crystalline propylene random copolymer (C-PP) is a random ethylene propylene copolymer.

The polypropylene composition generally has total comonomer, preferably ethylene, content in the range of 7.0 to 25.0 wt %, preferably in the range of 7.5 to 22.0 wt %, more preferably in the range of 8.0 to 20.0 wt %. A suitable lower limit is 7.0 wt %, preferably 7.5 wt %, more preferably 8.0 wt %. A suitable upper limit is 25.0 wt %, preferably 22.0 wt %, more preferably 20.0 wt %. The total comonomer content in the polypropylene composition is calculated based on the total amount of monomers comprised in the crystalline propylene random copolymer (C-PP) and the amorphous propylene copolymer (AM-PP) comprised in the polypropylene composition.

The crystalline propylene random copolymer (C-PP) has comonomer content in the range of 1.0 to 6.5 wt %, preferably in the range of 2.0 to 6.2 wt %, more preferably in the range of 2.5 to 6.0 wt %. A suitable lower limit is 1.0 wt %, preferably 2.0 wt %, more preferably 2.5 wt %. A suitable upper limit is 6.5 wt %, preferably 6.2 wt %, more preferably 6.0 wt %. The total comonomer content in the crystalline propylene random copolymer (C-PP) is calculated based on the total amount of monomers in the crystalline propylene random copolymer (C-PP). The crystalline propylene random copolymer (C-PP) has a melt flow rate (MFR$_2$) in the range of 0.1 to 15 g/10 min. The MFR$_2$ for the crystalline propylene random copolymer (C-PP) is determined according to ISO 1133 at a temperature of 230° C. and under a load of 2.16 kg. It is preferred that the crystalline propylene random copolymer (C-PP) has an MFR$_2$ in the range of 0.3 to 10.0 g/10 min, more preferably in the range of 0.4 to 9.0 g/10 min. A suitable lower limit is 0.1 g/10 min, preferably 0.3 g/10 min, more preferably 0.4 g/10 min. A suitable upper limit is 15.0 g/10 min, preferably 10.0 g/10 min, more preferably 9.0 g/10 min. The crystalline propylene random copolymer (C-PP) has a melting temperature in the range of 135 to 155° C. as measured according to ISO 11357-3, preferably in the range of 138 to 152° C., more preferably in the range of 140 to 150° C. A suitable lower limit is 135° C., preferably 138° C., more preferably 140° C. A suitable upper limit is 155° C., preferably 152° C., more preferably 150° C.

The amorphous propylene copolymer (AM-PP) has comonomer content in the range of 30.0 to 50.0 wt %, preferably in the range of 35.0 to 49.0 wt %, more preferably in the range of 37.0 to 49.0 wt %. A suitable lower limit is 30.0 wt %, preferably 35.0 wt %, more preferably 37.0 wt %. A suitable upper limit is 50.0 wt %, preferably 49.0 wt %. The total comonomer content in the amorphous propylene copolymer (AM-PP) is calculated based on the total amount of monomers in the amorphous propylene copolymer (AM-PP).

The polypropylene composition according to the invention comprises 55.0 to 90.0 wt % of the crystalline propylene random copolymer (C-PP) and 10.0 to 45.0 wt % of the amorphous propylene copolymer (AM-PP). Preferably the polypropylene composition according to the invention comprises 60.0 to 89.0 wt % of the crystalline propylene random copolymer and 11.0 to 40.0 wt % of the amorphous propylene copolymer, more preferably the polypropylene composition according to the invention comprises 65.0 to 88.0 wt % of the crystalline propylene random copolymer and 12.0 to 35.0 wt % of the amorphous propylene copolymer. The weight percentages are relative to the total weight of the C-PP and AM-PP copolymers.

Generally the polypropylene composition has a melt flow rate (MFR$_2$) in the range of 0.3 to 90.0 g/10 min. The MFR$_2$ of the polypropylene composition is determined according to ISO 1133 at a temperature of 230° C. and under a load of 2.16 kg. It is preferred that the polypropylene composition has an MFR$_2$ in the range of 0.4 to 50.0 g/10 min, more preferably in the range of 0.5 to 25.0 g/10 min, even more preferably in the range of 0.5 to 10.0 g/10 min, even most preferably of less than 4.0 g/10 min. A suitable lower limit is 0.3 g/10 min, preferably 0.4 g/10 min, more preferably 0.5 g/10 min. A suitable upper limit is 90.0 g/10 min, preferably 50.0 g/10 min, more preferably 25.0 g/10 min, even more preferably 10.0 g/10 min, even most preferably less than 4.0 g/10 min. Generally the polypropylene composition has a relative content of isolated to block comonomer sequences I(E) in the range of 20.0 to 50.0%, which is calculated according to the equation:

$$I(E)=fPEP/((fEEE+fPEE+fPEP))\times 100 \quad (1)$$

wherein
I(E) is the relative content of isolated to block comonomer sequences [in %];
fPEP is the mol fraction of propylene/comonomer/propylene sequences (PEP) in the sample;
fPEE is the mol fraction of propylene/comonomer/comonomer sequences (PEE) and of comonomer/comonomer/propylene sequences (EEP) in the sample;
fEEE is the mol fraction of comonomer/comonomer/comonomer sequences (EEE) in the sample
wherein all sequence concentrations being based on a statistical triad analysis of $^{13}$C-NMR data. Preferably, I(E) is in the range of 22.0 to 47.0%, more preferably in the range of 23.0 to 45.0%. Most preferably the comonomer is only ethylene and the I(E) relates to the relative content of isolated to block ethylene sequences.

The xylene cold soluble (XCS) fraction of the polypropylene composition, measured according to ISO 16152 at 25° C., is typically in the range of 15.0 to 50.0 wt %, preferably in the range from 15.0 to 45 or 17.0 to 45.0 wt %, more preferably in the range from 18.0 to 42.0 wt %. A suitable lower limit is 15.0 wt %, preferably 17.0 wt %, more preferably 18.0 wt %. A suitable upper limit is 50.0 wt %, preferably 45.0 wt %, more preferably 42.0 wt %. The xylene cold soluble fraction (XCS) of the polypropylene composition preferably has an intrinsic viscosity (IV) in the range of 1.0 to 4.5 dl/g, preferably in the range of 1.2 to 4.0 or 1.2 to 3.7 dl/g, more preferably in the range of 1.3 to 3.5 dl/g. A suitable lower limit is 1.0 dl/g, preferably 1.2 dl/g, more preferably 1.3 dl/g. A suitable upper limit is 4.5 dl/g, preferably 3.7 dl/g, more preferably 3.5 dl/g. Generally the xylene cold soluble fraction (XCS) of the polypropylene composition has a comonomer content in the range of 25.0 to 50.0 wt %, preferably in the range of 27.0 to 47.0 wt %, more preferably in the range of 28.0 to 45.0 or 30-45 wt %. A suitable lower limit is 25.0 wt %, preferably 27.0 wt %, more preferably 28.0 wt %. A suitable upper limit is 50.0 wt %, preferably 47.0 wt %, more preferably 45.0 wt %. Generally the xylene cold soluble fraction (XCS) of the polypropylene composition has a relative content of isolated to block comonomer, preferably ethylene, sequences I(E) as calculated by equation (1) above in the range of 15.0 to 45.0%, preferably in the range of 17 or 18.0 to 40.0%, more preferably in the range of 19.0 or 20 to 35.0%. A suitable lower limit is 15.0%, preferably 18.0%, more preferably 19.0%. A suitable upper limit is 45.0%, preferably 40.0%, more preferably 35.0%.

The polypropylene composition generally has at least two glass transition temperatures Tg(a) and Tg(b). The polypropylene composition generally has a glass transition temperature Tg(a) related to the crystalline propylene random copolymer (C-PP) in the range of −10.0 to 1.0° C., preferably in the range of −8.0 to 0.0° C., more preferably in the range of −7.0 to −1.0° C. A suitable lower limit is −10.0° C., preferably −8.0° C., more preferably −7.0° C. A suitable upper limit is 1.0° C., preferably 0.0° C., more preferably −1.0° C. The polypropylene composition has a glass transition temperature Tg(b) related to the amorphous propylene copolymer (AM-PP) in the range of −60.0 to −40.0° C., preferably in the range of −58.0 to −45.0° C., more preferably in the range of −57.0 to −48.0° C. A suitable lower limit is −60.0° C., preferably −58.0° C., more preferably −57.0° C. A suitable upper limit is −40.0° C., preferably −45.0° C., more preferably −48.0° C. The glass transition temperature gives an indication of the overall performance of the polypropylene composition at that glass transition temperature (in both cases Tg(a) and Tg(b)) and in a considerably large temperature range around such glass transition temperature. In particular, the glass transition temperature gives an indication of the performance of the polypropylene composition at higher temperatures (higher than the Tg). For example, when the polypropylene composition, when applied on a substrate or applied between substrates, in a particular component, is subjected to a rapid deformation or to an impact event, the toughness at low temperatures as reflected by the glass transition temperature value also contributes to the toughness at higher temperatures, specifically at high deformation speed. When the polypropylene composition has more than one glass transition temperature, each of them gives an indication of the overall performance of the polypropylene composition at and around each glass transition temperature. Thus the glass transition temperatures of the polypropylene composition plays an important role in its properties like for example cohesive properties, elasticity, toughness and flexibility. The glass transition temperature as indicated in the range of Tg(b) is very advantageous because it gives an indication of the overall performance of the polypropylene composition at both such lower temperature ranges and for the higher temperatures as indicated above, e.g. at room temperature. The advantage when the polypropylene composition is applied on for example, a substrate subjected to subzero temperatures is that the polypropylene composition presents good cold temperature properties. Examples of the application of the polypropylene composition are sealed packages, sealed cases, sealed cartons or sealed trays as well as construction elements, window frames, automotive parts, assembly parts and non-woven articles stored or in use at subzero temperatures.

The polypropylene composition preferably has a Vicat-A temperature of more than 80° C., preferably in the range of 85 to 130° C., more preferably in the range of 87 to 128° C., even more preferably in the range of 88 to 125° C. The Vicat-A temperature of the polypropylene composition is determined according to ISO 306.

Preferably the polypropylene composition has a storage modulus (G'23) in the range of 150 to 450 MPa, preferably in the range of 170 to 420 MPa, more preferably in the range of 180 to 400 MPa. The storage modulus (G'23) of the polypropylene composition is determined according to ISO 6721-07 at 23° C. A suitable lower limit is 150 MPa, preferably 170 MPa, more preferably 180 MPa. A suitable upper limit is 450 MPa, preferably 420 MPa, more preferably 400 MPa.

The polypropylene composition preferably has a tensile modulus (E) in the range of 300 to 700 MPa, as measured at 23° C. according to ISO 527 on injection moulded specimens. It is preferred that the polypropylene composition has a tensile modulus in the range of 330 to 670 MPa, more preferably in the range of 350 to 650 MPa. A suitable lower limit is 300 MPa, preferably 330 MPa, more preferably 350 MPa. A suitable upper limit is 700 MPa, preferably 670 MPa, more preferably 650 MPa.

The polypropylene composition preferably has a Flexibility of more than 0.8 which is calculated according to the equation:

$$\text{Flexibility} = EAY*100000/(TSY*E) \quad (2)$$

wherein:
EAY is the elongation at yield value,
TSY is the tensile strength at yield value, in MPa and
E is the tensile modulus value, in MPa,
EAY, TSY, and E are determined at 23° C. according to ISO 527.

The polypropylene composition preferably has a Flexibility of more than 0.9, more preferably a Flexibility of more than 1.1.

Generally the polypropylene composition has a hot-tack force in the range of 1.8 to 6.0 N. The hot-tack force of the polypropylene composition is measured on films according to the method description explained in the Examples section of this document. It is preferred that the polypropylene composition has a hot-tack force in the range of 1.9 to 5.5 N, more preferably in the range of 2.0 to 5.0 N. A suitable lower limit is 1.8 N, preferably 1.9 N, more preferably 2.0 N. A suitable upper limit is 6.0 N, preferably 5.5 N, more preferably 5.0 N.

The polypropylene composition generally has a melting temperature in the range of 135 to 155° C. as measured according to ISO 11357-3, preferably in the range of 138 to 152° C., more preferably in the range of 140 to 150° C. A suitable lower limit is 135° C., preferably 138° C., more preferably 140° C. A suitable upper limit is 155° C., preferably 152° C., more preferably 150° C.

The present invention also relates to the polypropylene composition according to the invention further comprising at least one additional components selected of: a polymer other than the crystalline propylene random copolymer (C-PP) and the amorphous propylene copolymer (AM-PP), a tackifying resin, a plasticizer, an additive and/or a filler. Examples of polymers other than the crystalline propylene random copolymer (C-PP) and the amorphous propylene copolymer (AM-PP) are: high pressure polyethylene and co-polymers thereof, like low density polyethylene (LDPE), ethylene-vinyl acetate (EVA) and ethylene-acrylate co-polymers, low pressure polyethylene, like high density polyethylene (HDPE), medium density polyethylene (MDPE), linear low density polyethylene (LLDPE), very low density polyethylene (VLDPE), styrene-butadiene copolymer (SBC), styrene-ethylene/butylene-styrene (SEBS), polyolefin based plastomer (POP) and elastomers (POE), amorphous poly alpha-olefin (APAO) and wax. The term "wax" refers to an organic substance having an average molecular weight of <10000 g/mol, which is solid at normal temperature and becomes liquid when heated, and is commonly considered a "wax". There is not a particular limitation on the type of wax as long as the composition according to the invention can be obtained. Examples of known waxes are: micro crystalline wax, synthetic wax and paraffin wax.

Suitable ethylene-acrylate copolymers according to the present invention can be for example a copolymer of ethylene and methyl acrylate which is commercially available, e.g. from Dupont under the name Elvaloy™.

Suitable polyolefin based plastomer (POP) and elastomers (POE) according to the present invention can be any copolymer of ethylene and propylene or ethylene and $C_4$-$C_{10}$ alpha olefin which are commercially available, e.g. from Borealis Plastomers (NL) under the trade name Queo™, from DOW Chemical Corp. (USA) under the trade name Engage™ or Affinity™, or from Mitsui under the trade name Tafmer™.

Suitable amorphous poly alpha-olefins (APAO) according to the present invention can be any amorphous poly alpha-olefin commercially available, e.g. from Rextac under the name of Rextac™ or from Evonik under the name of Vestoplast™.

The tackifying resin can be a molecule or a macromolecule. Generally it is a chemical compound or a polymer of fairly low molecular weight, compared to common polymers. The polymer can be from a natural source or from a chemical process or combination thereof. The tackifying resin generally enhances the adhesion of a final polypropylene composition when such inventive polypropylene composition is used in for example an adhesive application.

The plasticizer comprised in the polypropylene composition according to the present invention can be selected from: mineral based oil, petroleum based oil, liquid resin, liquid elastomer, polybutene, polyisobutene, phthalate plasticizer, benzoate plasticizer, epoxidized soya oil, vegetal oil, olefin oligomer, low molecular weight polymer, solid plasticizer and mixtures of any of them.

Examples of additives that can be used in the polypropylene composition according to the present invention include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox™ MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example benzoates, phosphorous-based compounds, sorbitoles, nonitol-based compounds or amide-based compounds), as well as slip and antiblocking agents (for example erucamide, oleamide, natural silica and synthetic silica or zeolites) and mixtures thereof.

Examples of fillers suitable to be comprised in the polypropylene composition according to the present invention include, but are not limited to talc, calcium carbonate, calcium sulphate, clay, kaolin, silica, glass, fumed silica, mica, wollastonite, feldspar, aluminium silicate, calcium silicate, alumina, hydrated alumina such as alumina trihydrate, glass microsphere, ceramic microsphere, wood flour, marble dust, magnesium oxide, magnesium hydroxide, antimony oxide, zinc oxide, barium sulphate and/or titanium dioxide. Here and hereinafter mineral modifiers are comprised in the term filler. The man skilled in the art can without undue burden easily determine the most appropriate amount of components in the polypropylene composition for a certain application.

The amount of additional components in the composition depend on the envisaged end use. For hot melt adhesive application the polypropylene composition typically comprises:
 a) at least 10.0 wt % of the polypropylene composition according to the invention,
 b) a polymer other than the crystalline propylene random copolymer (C-PP) and the amorphous propylene copolymer (AM-PP) in the range of 0.0 to 50.0 wt %,
 c) a tackifying resin in a range of 0.0 to 70.0 wt %,
 d) a plasticizer in a range of 0.0 to 60.0 wt %,
 e) an additive in a range of 0.1 to 4.0 wt %
 and/or
 f) a filler in a range of 0.0 to 50.0 wt %
said percentages being calculated based on the total amount of the polypropylene composition components (a) to (f).

The amount of polymer other than the crystalline propylene random copolymer
(C-PP) and the amorphous propylene copolymer (AM-PP) is generally in the range of 0.0 to 50.0 wt %, preferably in the range of 3.0 to 40.0 wt %, more preferably in the range of 5.0 to 35.0 wt %. A suitable lower limit is 0.0 wt %, preferably 3.0 wt %, more preferably 5.0 wt %. A suitable upper limit is 50.0 wt %, preferably 40.0 wt %, more preferably 35.0 wt %. The amount of tackifying resin present in the polypropylene composition according to the invention is generally in the range of 0.0 to 70.0 wt %, preferably in the range of 10.0 to 60.0 wt %, more preferably in the range of 15.0 to 55.0 wt %. A suitable lower limit is 0.0 wt %, preferably 10.0 wt %, more preferably 15.0 wt %. A suitable upper limit is 70.0 wt %, preferably 60.0 wt %, more preferably 55.0 wt %. The amount of plasticizer present in the polypropylene composition according to the invention is generally in the range of 0.0 to 60.0 wt %, preferably in the range of 3.0 to 55.0 wt %, more preferably in the range of 5.0 to 45.0 wt %. A suitable lower limit is 0.0 wt %, preferably 3.0 wt %, more preferably 5.0 wt %. A suitable upper limit is 60.0 wt %, preferably 55.0 wt %, more preferably 45.0 wt %. The amount of additive present in the polypropylene composition according to the invention is generally in the range of 0.1 to 4.0 wt %, preferably in the range of 0.15 to 3.0 wt %, more preferably in the range of 0.20 to 2.0 wt %. A suitable lower limit is 0.1 wt %, preferably 0.15 wt %, more preferably 0.20 wt %. A suitable upper limit is 4.0 wt %, preferably 3.0 wt %, more preferably 2.0 wt %. The amount of filler in the polypropylene composition according to the invention is generally in the range of 0.0 to 50.0 wt %, preferably in the range of 0.5 to 40.0 wt %, more preferably in the range of 1.0 to 30.0 wt %. A suitable lower limit is 0.0 wt %, preferably 0.5 wt %, more preferably 1.0 wt %. A suitable upper limit is 50.0 wt %, preferably 40.0 wt %, more preferably 30.0 wt %. The man skilled in the art can choose the most appropriate type and amount of additional components in the polypropylene composition according to the invention for a certain application.

In view of an envisaged use in hot melt adhesive applications the polypropylene composition preferably comprises:
- a) at least 10.0 wt % of the polypropylene composition according to the invention,
- b) a polymer other than the crystalline propylene random copolymer (C-PP) and the amorphous propylene copolymer (AM-PP) in the range of 3.0 to 40.0 wt %,
- c) a tackifying resin in a range of 10.0 to 60.0 wt %,
- d) a plasticizer in a range of 3.0 to 55.0 wt %,
- e) an additive in a range of 15.0 to 3.0 wt % and/or
- f) a filler in a range of 0.5 to 40.0 wt % said percentages being calculated based on the total amount of polypropylene composition components (a) to (f). The invention also relates to the use of the polypropylene compositions of the invention, preferably the above described composition, as an adhesive composition or for the preparation of an adhesive composition.

In view of an envisaged use in hot tack film applications, the polypropylene composition is used preferably pure, that is with some additives but substantially no other polymers; preferably comprising:
- a) at least 90, preferably 92, 95 or even 97 wt % of a polypropylene composition consisting of crystalline propylene random copolymer (C-PP) and of amorphous propylene copolymer (AM-PP) and
- b) at least 0.1 wt %, 1.0 or 3.5 wt % of additives such as antioxidants, slip agents, antiblocking agents and/or nucleating agents said percentages being calculated based on the total amount of polypropylene composition components including components (a) to (b). For the purpose of making hot-tack films it is preferred to have a high hot-tack force for which it is preferred that the $MFR_2$ of the polypropylene composition is less than 4.0 g/10 min as measured according to ISO 1133 at a temperature of 230° C. The invention also relates in general to the use of the polypropylene compositions of the invention, preferably to the use of the above described composition, for the manufacture of hot tack films.

The invention further relates to an article comprising the polypropylene composition according to the invention. Such article comprising the polypropylene composition according to the invention can be chosen from a film, preferably a cast film or a blown film; a disposable diaper, a sanitary napkin, a bed pad, a bandage, a surgical drape, a tape, a label, a sheet (for example a plastic, a paper or a nonwoven sheet), a bottle (for example a plastic or glass bottle), a can, a board (for example a cardboard or a wooden board), a case, a wooden part, a book, a bag, a surgical drape, a surgical device, a medical device, a filter or a package (for example a box or a container). The article comprising the polypropylene composition according to the invention can also be a packaging article comprising elements of a multilayer film either alone or in combination with polyolefin-based films, extruded and/or thermoformed sheets or injection molded or blow molded articles. Typical examples include pouches essentially consisting of a multilayer film, like pillow pouches or stand-up pouches, thermoformed cups from a polyolefin sheet with a lid consisting of a multilayer film, injection-moulded cups or beakers with a lid consisting of a multilayer film as well as bottles with a guarantee closure consisting of a multilayer film. Said packaging article can be used for example for packaging and transporting food and non-food materials, medical and pharmaceutical preparations.

The invention also relates to a film comprising at least one surface layer, the surface layer comprising the polypropylene composition according to the invention and exhibiting a hot-tack force of at least 1.8 N when measured in said surface layer. The at least one surface layer comprised in the film according to the invention preferably comprises the polypropylene composition comprising:
- a) at least 90, preferably 92, or 95.0 wt % of a polypropylene composition consisting of crystalline propylene random copolymer (C-PP) and of amorphous propylene copolymer (AM-PP) and
- b) at least 0.1 wt % of additives such as antioxidants, slip agents, antiblocking agents and/or nucleating agents said percentages being calculated based on the total amount of polypropylene composition components including components (a) to (b). The hot-tack force measured on the at least one surface layer comprised in the film according to the invention generally is at least 1.8 N, preferably in the range of 1.8 to 6.0 N, more preferably in the range of 1.9 to 5.5 N, even more preferably in the range of 2.0 to 5.0 N In a particular embodiment the film is a multilayer film having an overall thickness in the range of 30 to 500 μm and wherein the surface layer has a thickness in the range of 3 to 50 μm. Preferably the multilayer film has an overall thickness in the range of 50 to 400 μm, more preferably in the range of 60 to 300. The surface layer in the multilayer film preferably has a thickness in the range of 5 to 30 μm, more preferably in the range of 8 to 25 μm. Preferably the multilayer film according to the invention exhibits a hot-tack force in the range of 1.9 to 5.5 N, more preferably in the range of 2.0 to 5.0 N.

The invention also relates to an article comprising an adhesive composition comprising the polypropylene composition according to the invention and at least one substrate. Illustrative applications of such an article include, but are not limited to, medical application, construction application, nonwoven material application, food or general packaging application, bookbinding application, bottle labelling application and pressure sensitive application. The article comprising the adhesive composition according to the invention and at least one substrate can be chosen from a disposable diaper, a sanitary napkin, a bed pad, a bandage, a surgical drape, a tape, a film, a label, a sheet (for example a plastic, a paper or a nonwoven sheet), a bottle (for example a plastic or glass bottle), a can, a board (for example a cardboard or a wooden board), a case, a wooden part, a book, a bag, a surgical drape, a surgical device, a medical device, a filter or a package (for example a box or a container). Preferred articles comprising the adhesive composition according to the invention and at least one substrate are tapes, films, books and medical devices.

The substrate can be made out of one or more different substrate materials, for example nonwoven material, polymeric material, elastomeric material, wood, glass, paper, carton, concrete and ceramic material. The substrate can be in the form of for example a fiber, a film, a thread, a strip, a coating, a foil, a sheet, a board, a plate and a band. Any substrate material and any substrate form could be used in any combination possible with the adhesive composition serving to bond two or more substrates together.

The present invention is also directed to a process to produce an article comprising the adhesive composition according to the invention and at least one substrate comprising at least a step of applying at least one adhesive composition according to the invention on at least one surface of the at least one substrate at a temperature above the melt temperature.

Finally the present invention is also directed to a process to prepare an adhesive composition according to the invention comprising the steps of:
  a) mixing the polypropylene composition according to the invention with at least one of: a polymer other than the crystalline propylene random copolymer (C-PP) and the amorphous propylene copolymer (AM-PP), a tackifying resin, a plasticizer, an additive and/or a filler, in a mixing device,
  b) obtaining the adhesive composition.

Preferably the mixing step is carried out in a melt mixing device, more preferably in an extruder. When the mixing step is carried out in an extruder the at least one of: a polymer other than the crystalline propylene random copolymer (C-PP) and the amorphous propylene copolymer (AM-PP), a tackifying resin, a plasticizer, an additive and/or a filler can be introduced into the extruder via a side feeder for example.

An alternative adhesive composition is: 1—An adhesive composition comprising at least one polypropylene copolymer, wherein such polypropylene copolymer has:
  a) at least one comonomer selected from ethylene and/or $C_4$-$C_{12}$ alpha-olefin,
  b) a total comonomer content in the range of 4.5 to 20.0 wt %,
  c) Vicat-A temperature >80° C., as measured according to ISO 306,
  d) storage modulus (G'23) in the range of 100 to 1000 MPa as measured at 23° C. according to ISO 6721-02 and ISO 6721-07,
  e) melting temperature in the range of 120 to 160° C. as measured according to ISO 11357-3
and at least one of: a polymer other than the at least one polypropylene copolymer, a tackifying resin, a plasticizer, an additive and/or a filler.

2—An adhesive composition according to clause 1 wherein the polypropylene copolymer has a tensile modulus (E) in the range of 200 to 1000 MPa as measured according to ISO 527-1 at 23° C.

3—An adhesive composition according to any one of clause 1 to 2 wherein the polypropylene copolymer is a polypropylene copolymer-1 (PC-1) having at least one comonomer selected from ethylene and/or a $C_4$-$C_{12}$ alpha-olefin and wherein such polypropylene copolymer-1 (PC-1) has a Flexibility >0.8 which is calculated according to the equation: Flexibility=EAY*100000/(TSY*E) wherein: EAY is the elongation at yield value, TSY is the tensile strength at yield value, in MPa and E is the tensile modulus value, in MPa. 4—An adhesive composition according to clause 3 wherein the polypropylene copolymer-1 (PC-1) has: a glass transition temperature $T_{g1}$ in the range of −12 to −2° C. and a glass transition temperature $T_{g2}$ in the range of −65 to −20° C.

5—An adhesive composition according to any one of clause 3 to 4 wherein the polypropylene copolymer-1 (PC-1) has: storage modulus (G'23) in the range of 150 to 450 MPa as measured at 23° C. according to ISO 6721-02 and ISO 6721-07 and melting temperature in the range of 135 to 155° C. as measured according to ISO 11357-3

6—An adhesive composition according to any one of clause 1 to 2 wherein the polypropylene copolymer is a polypropylene copolymer-2 (PC-2) comprising units derived from propylene, ethylene and at least one comonomer selected from linear or branched $C_4$-$C_{12}$ alpha-olefin and wherein such polypropylene copolymer-2 (PC-2) has: a glass transition temperature $T_g$ in the range of −12 to 0° C. and a total comonomer content in the range of 6.0 to 15.0 wt %.

7—An adhesive composition according to clause 6 wherein the polypropylene copolymer-2 (PC-2) has: storage modulus (G'23) in the range of 300 to 600 MPa as measured at 23° C. according to ISO 6721-02 and ISO 6721-07 and melting temperature in the range of 125 to 135° C. as measured according to ISO 11357-3.

8—An adhesive composition according to any one of clause 6 to 7 wherein the polypropylene copolymer-2 (PC-2) has a tensile modulus (E) in the range of 500 to 1000 MPa as measured according to ISO 527-1 at 23° C.

9—An adhesive composition according to any one of clause 6 to 8 wherein the comonomers in the polypropylene copolymer-2 (PC-2) are ethylene and $C_4$ alpha-olefin.

10—An adhesive composition according to any one of clause 1 to 9 wherein the at least one polymer other than the at least one polypropylene copolymer has melting temperature <120° C. as measured according to ISO 11357-3, storage modulus (G'23)<50 MPa as measured at 23° C. according to ISO 6721-02 and ISO 6721-07, density <0.96 g/cm$^3$ as measured according to ISO 1183D and an $MFR_2$ in the range of 0.20 to 2000 g/10 min as measured according to ISO 1133.

11—An adhesive composition according to any one of clause 1 to 10 wherein such adhesive composition has: at least one polymer other than the at least one polypropylene copolymer present in the range of 0.01 to 50.0 wt %, the percentage of the at least one polymer other than the at least one polypropylene copolymer is calculated based on the total amount of polypropylene copolymer and of at least one polymer other than the at least one polypropylene copolymer comprised in the adhesive composition and Flexibility >0.5 and which is calculated according to the equation: Flexibility=EAY*100000/(TSY*E) wherein: EAY is the elongation at yield value, TSY is the tensile strength at yield value, in MPa and E is the tensile modulus value, in MPa.

12—An article comprising the adhesive composition according to any one of clause 1 to 11 and at least one substrate.

13—A process to produce an article according to clause 12 wherein the process comprises at least the step of applying at least one adhesive composition according to clause 1 to 11 on at least one surface of the at least one substrate.

14—Use of the adhesive composition according to any one of clause 1 to 11 in the preparation of an article according to clause 12.

15—A process to prepare an adhesive composition according to any one of clause 1 to 11 by combining at least one polypropylene copolymer with at least one of: a polymer other than the at least one polypropylene copolymer, a tackifying resin, a plasticizer, an additive and/or a filler.

EXAMPLES

I—Measuring Methods

The following definitions of terms and determination methods apply for the above description of the invention as well as to the below examples unless otherwise defined.
a) Vicat-A Temperature Measurement
  The Vicat-A temperature is determined according to ISO 306 (A50) using injection moulded test specimens having the following dimensions: 80×10×4 mm. The injection moulded test specimens are prepared as described in EN ISO 1873-2.

b) Melt Flow Rate

The melt flow rate ($MFR_2$) is determined according to ISO 1133 and is indicated in g/10 min. The $MFR_2$ is an indication of the flowability and hence the processability of the polymer. The higher the melt flow rate, the lower the viscosity of the polymer. The $MFR_2$ of polypropylene is determined at a temperature of 230° C. and under a load of 2.16 kg. The $MFR_2$ of polyethylene, of polyolefin based plastomer (POP) and of elastomer (POE) is determined at a temperature of 190° C. and under a load of 2.16 kg.

c) DSC Analysis

The melting temperature ($T_m$) and the crystallisation temperature ($T_c$) were measured with a TA Instrument Q2000 differential scanning calorimetry device (DSC) according to ISO 11357/3 on 5 to 10 mg samples. Crystallisation ($T_c$) and melting temperatures ($T_m$) were obtained in a heat/cool/heat cycle with a scan rate of 10° C./min between 30° C. and 225° C. Melting ($T_m$) and crystallisation ($T_c$) temperatures were taken as the peaks of the endotherms and exotherms in the cooling cycle and the second heating cycle respectively.

d) Xylene Cold Soluble (XCS)

The content of xylene cold soluble (XCS) is determined at 25° C. according to ISO 16152; fifth edition; 2005-07-01. The part which remains insoluble is the xylene cold insoluble (XCI) fraction.

e) Intrinsic Viscosity (IV)

The intrinsic viscosity (IV) is measured according to ISO 1628/1, in decalin at 135° C. The intrinsic viscosity (IV) value increases with the molecular weight of a polymer.

f) Hot-Tack Force

The hot-tack force was determined according to ASTM F1921-12—Method B on a J&B Hot-Tack Tester on a 50 μm thickness film produced on a monolayer cast film line at a melt temperature of 220° C. and a chill roll temperature of 20° C.

All film test specimens were prepared in standard atmospheres for conditioning and testing at 23° C. (±2° C.) and 50% (±10%) relative humidity. The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions.

Film Specimen width: 25.4 mm.
Seal bar length: 50 mm
Seal bar width: 5 mm
Seal bar shape: flat
Seal Pressure: 0.3 N/mm$^2$.
Seal Time: 0.5 sec.
Cool time: 99 sec.
Peel Speed: 200 mm/sec.
Start temperature: 90° C.
End temperature: 140° C.
Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve (The FIGURE). The Hot Tack force is evaluated from the curve as the highest force (maximum peak value) with failure mode "peel".

g) Dynamic Mechanical Thermal Analysis (DMTA)

The storage modulus G' and the glass transition temperature Tg were measured by DMTA analysis. The DMTA evaluation and the storage modulus G' measurements were carried out in torsion mode on compression moulded samples at temperature between −130° C. and +150° C. using a heating rate of 2° C./min and a frequency of 1 Hz, according to ISO 6721-07. The measurements were carried out using an Anton Paar MCR 301 equipment. The compressed moulded samples have the following dimensions: 40×10×1 mm and are prepared in accordance to ISO 1872-2:2007. The storage modulus G'23 was measured at 23° C.

h) Tensile Properties

The tensile properties, the elongation at break (EAB), elongation at yield (EAY), tensile strength at break (TSB) and tensile strength at yield (TSY) were measured at 23° C. according to ISO 527-1:2012/ISO 527-2:2012 using an extensometer (Method B) on injection moulded specimens, type 1B, produced according to ISO 1873-2 with 4 mm sample thickness. The test speed was 50 mm/min, except for the tensile modulus (E) measurement which was carried out at a test speed of 1 mm/min.

i) Comonomer Content

Quantitative nuclear-magnetic resonance (NMR) spectroscopy was used to quantify the comonomer content of the polymers.

j) Comonomer Content Quantification of Poly(Propylene-Co-Ethylene) Copolymers

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme{3, 4}. A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regio-defects when needed.

Integral regions were slightly adjusted to increase applicability across the whole range of encountered comonomer contents.

For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

BIBLIOGRAPHIC REFERENCES

1—Busico, V., Cipullo, R., Prog. Polym. Sci. 26 (2001) 443.
2—Busico, V., Cipullo, R., Monaco, G., Vacatello, M., Segre, A. L., Macromoleucles 30 (1997) 6251.
3—Zhou, Z., Kuemmerle, R., Qiu, X., Redwine, D., Cong, R., Taha, A., Baugh, D. Winniford, B., J. Mag. Reson. 187 (2007) 225.
4—Busico, V., Carbonniere, P., Cipullo, R., Pellecchia, R., Severn, J., Talarico, G., Macromol. Rapid Commun. 2007, 28, 1128.
5—Resconi, L., Cavallo, L., Fait, A., Piemontesi, F., Chem. Rev. 2000, 100, 1253.
6—Wang, W-J., Zhu, S., Macromolecules 33 (2000), 1157.
7—Cheng, H. N., Macromolecules 17 (1984), 1950.
8—Singh, G., Kothari, A., Gupta, V., Polymer Testing 28 5 (2009), 475.
9—Kakugo, M., Naito, Y., Mizunuma, K., Miyatake, T. Macromolecules 15 (1982) 1150.
10—Randall, J. Macromol. Sci., Rev. Macromol. Chem. Phys. 1989, C29, 201.

k) Content of Isolated to Block Ethylene Sequences I(E)

The content of isolated to block ethylene sequences is calculated from the triad sequence distribution according to equation (1):

$$I(E)=fPEP/((fEEE+fPEE+fPEP))\times 100 \qquad (1)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample
wherein all sequence concentrations being based on a statistical triad analysis of $^{13}$C-NMR data.

The comonomer sequence distribution at the triad analysis of $^{13}$C-NMR data was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

l) Flexibility

The Flexibility value is calculated according to the equation below:

$$Flexibility=EAY*100000/(TSY*E) \qquad (2)$$

wherein:
EAY is the elongation at yield value,
TSY is the tensile strength at yield value, in MPa and
E is the tensile modulus value, in MPa,
EAY, TSY, and E determined at 23° C. according to ISO 527.

II—Inventive and Comparative Examples a) Inventive Examples

IE-1, IE-2, IE-3, IE-4 and IE-5 are propylene copolymers.

b) Comparative Examples

CE-1 is a propylene ethylene random copolymer with $MFR_2$ of 1.9 g/10 min and melting point of 140° C., and is manufactured and distributed by Borealis. CE-2 is a propylene ethylene random copolymer produced by Borealis in a pilot scale plant using single site catalyst. It has an $MFR_2$ of 7 g/10 min and a melting point of 136° C.

c) Preparation of Inventive Propylene Copolymers IE-1, IE-2, IE-3, IE-4 and IE-5

The polymerisation process for the preparation of the Inventive Examples according to the invention was carried in a process comprising a pre-polymerisation reactor (PRE-POL), a loop reactor (loop), a gas-phase reactor-1 (GPR1) and a gas-phase reactor-2 (GPR2) all reactors being arranged in series. Such a process was carried out in the presence of a catalyst in combination with triethylaluminium (TEAL) as co-catalyst and di-cyclopentyldimethoxy silane as external donor (donor D).

The polymerisation conditions for the preparation of the Inventive examples are summarized in Table 1. The polymer data described in Table 1 are measured on the reactor samples.

The polypropylene compositions were prepared by melt blending the components on a co-rotating twin screw extruder type Coperion ZSK 40 (screw diameter 40 mm, L/D ratio 38) at temperatures in the range of 170-190° C., using a high intensity mixing screw configuration with two sets of kneading blocks. In each formulation it contains 500 ppm of Irganox 1010 (Pentaerythrityl-tetrakis(3-(3',5'-di-tert. butyl-4-hydroxyphenyl)-propionate, CAS No. 6683-19-8), 500 ppm of Irgafos 168 (Tris (2,4-di-t-butylphenyl) phosphite, CAS No. 31570-04-4) and 400 ppm of Calcium stearate (CAS. No. 1592-23-0) as additives.

The polymer data described in Table 2 are measured on the pellets obtained after melt blending as described above. The amount of crystalline propylene random copolymer (C-PP), in wt %, shown in Table 2 is the sum of the amount-1 (in Loop) and the amount-2 (in GPR1) shown in Table 1.

The amount of amorphous propylene copolymer (AM-PP), in wt %, shown in Table 2 represents the amount of amorphous propylene copolymer (AM-PP), shown in Table 1.

Catalyst

The catalyst used in the preparation of the Inventive Examples according to the invention is prepared as follows:

a) Preparation of the Mg-Complex

In a 150 l steel reactor 19.3 kg of 2-ethyl hexane-1-ol were added at 20° C. Then 56.0 kg of a 20% BOMAG A (Tradename) [Mg(Bu)$_{1.5}$(Oct)$_{0.5}$] solution in toluene were slowly added to the well stirred alcohol. The temperature of the mixture was then increased to 60° C. and the reactants were allowed to react for 30 minutes at this temperature. After addition of 5.5 kg of 1,2-phthaloyl dichloride, the reaction mixture was stirred at 60° C. for another 30 minutes. Then 13.8 kg of 1-chloro butane were added at 60° C. and stirring at this temperature was continued for 30 minutes. After cooling the reaction medium to room temperature, a yellow solution was obtained (Mg-complex solution).

b) Preparation of the Catalyst 100 ml of titanium chloride were placed in a 1 l reactor equipped with a mechanical stirrer. The mixing speed is adjusted to 110 rpm. After addition of 50 ml of n-heptane, 180 ml of the Mg-complex solution was added to the well-stirred reaction mixture at 25° C. within 10 minutes. A dark red emulsion was formed. After the addition of the Mg-complex solution, 15 ml of toluene solution containing 45 mg polydecene was added. Then 10 ml of Viscoplex® 1-254 was added. 10 minutes later the temperature of the reactor was increased to 90° C. and stirring at this temperature continued for 30 minutes. After settling and filtering, the solid was washed with 200 ml of toluene containing 0.1% vol of diethyl aluminium chloride at 90° C. for 35 minutes. Then the solid was washed two times with 150 ml of heptane for 10 minutes each. Then the catalyst was taken out of the reactor to a separate drying vessel as a slurry with 100 ml of heptane. Finally, the solid catalyst was dried at 60° C. by purging nitrogen through the catalyst bed.

From Table 2 it can be derived that the propylene copolymers (inventive examples) show a higher hot-tack force compared to the comparative examples.

TABLE 1

Polymerization conditions for Inventive Examples.

| | | Unit | IE-1 | IE-2 | IE-3 | IE-4 | IE-5 |
|---|---|---|---|---|---|---|---|
| PRE-POL | Temperature | ° C. | 20 | 30 | 30 | 31 | 30 |
| | TEAL/Ti | mol/mol | 265 | 264 | 266 | 234 | 161 |
| | TEAL/Donor | mol/mol | 7 | 8 | 8 | 7.3 | 7.3 |
| | Residence time | h | 0.38 | 0.36 | 0.36 | 0.34 | 0.34 |
| | Donor | — | D | D | D | D | D |
| Loop | Temperature | ° C. | 70 | 70 | 70 | 70 | 70 |
| | H2/C3 | mol/kmol | 0.17 | 0.23 | 0.36 | 0.34 | 0.34 |
| | C2/C3 | mol/kmol | 4.44 | 4.10 | 4.72 | 5.50 | 5.80 |
| | Amount-1 | % | 32 | 34 | 31 | 29 | 29 |
| | MFR$_2$ | g/10 min | 0.58 | 0.61 | 0.93 | 3.5 | 6.0 |
| | XCS | wt % | 6.7 | 6.3 | 6.5 | 6.0 | 6.3 |
| | Residence time | h | 0.38 | 0.40 | 0.40 | 0.39 | 0.40 |
| | C2 content | wt % | 2.5 | 2.3 | 2.4 | 2.1 | 2.7 |
| GPR1 | Temperature | ° C. | 80 | 80 | 80 | 80 | 80 |
| | H2/C3 | mol/kmol | 3.22 | 3.30 | 3.60 | 25.0 | 18.1 |
| | C2/C3 | mol/kmol | 27.5 | 44.7 | 30.2 | 37.8 | 27.9 |
| | Amount-2 | % | 52 | 51 | 47 | 58 | 57 |
| | MFR$_2$ | g/10 min | 0.74 | 0.72 | 1.06 | 4.7 | 8.4 |
| | XCS | wt % | 7.4 | 15.8 | 7.7 | 6.2 | 7.7 |
| | Residence time | h | 2.25 | 2.10 | 2.10 | 2.08 | 1.91 |
| | C2 content | wt % | 3.8 | 5.9 | 4.2 | 3.8 | 3.8 |
| GPR2 | Temperature | ° C. | 70 | 70 | 70 | 75 | 75 |
| | H2/C3 | mol/kmol | 71 | 68 | 68 | 258 | 261 |
| | C2/C3 | mol/kmol | 567 | 573 | 563 | 517 | 511 |
| | Amount-3 | % | 16 | 15 | 22 | 13 | 14 |
| | MFR$_2$ | g/10 min | 0.53 | 0.58 | 0.59 | 4.6 | 6.3 |
| | XCS | wt % | 22.0 | 22.4 | 29.1 | 19.4 | 19.4 |
| | Residence time | h | 1.40 | 1.45 | 1.75 | 0.70 | 1.10 |
| | C2 content | wt % | 10.4 | 11.3 | 13.9 | 8.5 | 9.0 |

TABLE 2

Propylene copolymers properties (inventive and comparative examples).

| | Unit | IE-1 | IE-2 | IE-3 | IE-4 | IE-5 | CE-1 | CE-2 |
|---|---|---|---|---|---|---|---|---|
| MFR$_2$ | g/10 min | 0.53 | 0.58 | 0.59 | 4.6 | 6.3 | 2.0 | 5.0 |
| Total comonomer content | wt % | 10.5 | 11.2 | 16.4 | 8.2 | 8.7 | 4.5 | 4.7 |
| XCS | wt % | 22.0 | 22.4 | 29.1 | 19.4 | 19.4 | 8.3 | 19.2 |
| Intrinsic viscosity of XCS fraction | dl/g | 3.1 | 2.9 | 3.3 | 1.6 | 1.5 | n.d. | 1.5 |
| C$_2$ of XCS fraction | wt % | 35 | 36 | 41 | 32.1 | 33.2 | n.d. | 8.0 |
| Amount of crystalline propylene random copolymer (C-PP) | wt % | 84 | 85 | 78 | 87 | 86 | 100 | 100 |
| Amount of amorphous propylene copolymer (AM-PP) | wt % | 16 | 15 | 22 | 13 | 14 | 0 | 0 |
| T$_m$ (C-PP) | ° C. | 143 | 144 | 147 | 141 | 142 | 140 | 136 |

TABLE 2-continued

Propylene copolymers properties (inventive and comparative examples).

|  | Unit | IE-1 | IE-2 | IE-3 | IE-4 | IE-5 | CE-1 | CE-2 |
|---|---|---|---|---|---|---|---|---|
| Tg(a) | °C. | −4.0 | −6.1 | −3.3 | −4.1 | −4.0 | −4.0 | −6.0 |
| Tg(b) | °C. | −56.0 | −54.7 | −55.0 | −54.0 | −56.0 | n.d. | n.d. |
| G'23 | MPa | 308 | 253 | 263 | 346 | 389 | 482 | 352 |
| I(E) | % | 33 | 37 | 25 | 43 | 36 | 63 | 59 |
| I(E) of XCS fraction | % | 25 | 29 | 21 | 29 | 25 | n.d. | 45 |
| Vicat-A temperature | °C. | 111 | 112 | 109 | 118 | 114 | 125 | 110 |
| Tensile modulus (E) | MPa | 585 | 458 | 503 | 576 | 601 | 702 | 654 |
| Tensile strength at yield (TSY) | MPa | 19 | 14 | 17 | 18 | 20 | 22 | 13 |
| Elongation at yield (EAY) | % | 15 | 16 | 15 | 21 | 20 | 27 | 14 |
| Tensile strength at break (TSB) | MPa | 25 | 21 | 22 | 14 | 15 | 17 | 10 |
| Elongation at break (EAB) | % | 440 | 456 | 450 | 540 | 525 | 343 | 493 |
| Flexibility |  | 1.35 | 2.50 | 1.75 | 2.03 | 1.66 | 1.75 | 1.91 |
| Hot-tack force | N | 3.21 | 2.90 | 4.03 | 2.50 | 2.10 | 1.60 | 1.40 | n.d. = not determined

The invention claimed is:

1. A polypropylene composition comprising:
    a) 55.0 to 90.0 wt % of a crystalline propylene random copolymer (C-PP) comprising propylene monomers and 1.0 to 6.5 wt % of at least one comonomer selected from ethylene and a $C_4$-$C_{12}$ alpha olefin, having a melting temperature in the range of 135 to 155° C. as measured according to ISO 11357-3 and a melt flow rate ($MFR_2$) in the range of 0.1 to 15 g/10 min as measured according to ISO 1133 at a temperature of 230° C. and under a load of 2.16 kg; and
    b) 10.0 to 45.0 wt % of an amorphous propylene copolymer (AM-PP) comprising propylene monomers and 30.0 to 50.0 wt % of at least one comonomer selected from ethylene and a $C_4$-$C_{12}$ alpha olefin and having a glass transition temperature Tg(b) in the range of −60 to −40° C., the wt % of the C-PP and AM-PP copolymers being relative to the total weight of the C-PP and AM-PP copolymers,
said polypropylene composition having a melt flow rate ($MFR_2$) in the range of 0.3 to 90 g/10 min as measured according to ISO 1133 at a temperature of 230° C. and under a load of 2.16 kg and also having a relative content of isolated to block comonomer sequences I(E) in the range of 20 to 50%, which is calculated according to the equation:

$$I(E)=fPEP/((fEEE+fPEE+fPEP))\times 100 \quad (1)$$

wherein:
    I(E) is the relative content of isolated to block comonomer sequences [in %];
    fPEP is the mol fraction of propylene/comonomer/propylene sequences (PEP) in the sample;
    fPEE is the mol fraction of propylene/comonomer/comonomer sequences (PEE) and of comonomer/comonomer/propylene sequences (EEP) in the sample;
    fEEE is the mol fraction of comonomer/comonomer/comonomer sequences (EEE) in the sample; and
    all sequence concentrations being based on a statistical triad analysis of $^{13}$C-NMR data.

2. The polypropylene composition according to claim 1 wherein at least 50 wt % of the comonomers in the crystalline propylene random copolymer (C-PP) and in the amorphous propylene copolymer (AM-PP) are ethylene comonomers, and wherein the comonomers are only ethylene and butylene.

3. The polypropylene composition according to claim 1 having a matrix (M) of the crystalline propylene random copolymer (C-PP) and dispersed therein an amorphous phase of the amorphous propylene copolymer (AM-PP).

4. The polypropylene composition according to claim 1 having a xylene cold soluble (XCS) content, determined according ISO 16152 at 25° C., in the range of 15.0 to 50.0 wt %, wherein the XCS fraction has a comonomer content between 25 and 50 wt %, the XCS fraction further has an intrinsic viscosity between 1.2 and 4 dl/g, and wherein the XCS fraction further has a I(E) between 15 and 45%.

5. The polypropylene composition according to claim 1 having a total comonomer content in the range of 7.0 to 25.0 wt %, the total comonomer content being calculated based on the total amount of monomers comprised in the crystalline propylene random copolymer (C-PP) and the amorphous propylene copolymer (AM-PP) comprised in the polypropylene composition.

6. The polypropylene composition according to claim 1 wherein the polypropylene composition has at least two glass transition temperatures:
    a) a glass transition temperature Tg(a) in the range of −10.0 to 1.0° C., and
    b) a glass transition temperature Tg(b) in the range of −60 to −40° C.,
wherein Tg(a) relates to the crystalline propylene random copolymer (C-PP) and Tg(b) relates to the amorphous propylene copolymer (AM-PP).

7. The polypropylene composition according to claim 1 having:
    a) Vicat-A temperature of more than 80° C., as measured according to ISO 306, and
    b) storage modulus (G'23) in the range of 150 to 450 MPa as measured at 23° C. according to ISO 6721-07.

8. The polypropylene composition according to claim 1 having a tensile modulus (E) in the range of 300 to 700 MPa, as measured at 23° C. according to ISO 527 on injection molded specimens.

9. The polypropylene composition according to claim 1 having a Flexibility of more than 0.8 which is calculated according to the equation:

$$Flexibility=EAY*100000/(TSY*E)$$

wherein:
    EAY is the elongation at yield value,
    TSY is the tensile strength at yield value, in MPa,
    E is the tensile modulus value, in MPa, and
    EAY, TSY, and E are determined at 23° C. according to ISO 527.

10. The polypropylene composition according to claim 1 having a hot tack force in the range of 1.8 to 6.0 N.

11. A process for the manufacture of the polypropylene composition according to claim 1 comprising the steps of:
    a) in a pre-polymerisation reactor propylene is pre-polymerised in the presence of a Ziegler-Natta catalyst, a co-catalyst and an external donor, obtaining a reaction mixture (RM-1) comprising a polypropylene (Pre-PP),
    b) transferring the reaction mixture (RM-1) to a loop reactor,
    c) in the loop reactor propylene and at least one comonomer selected from ethylene and a $C_4$-$C_{12}$ alpha-olefin are polymerised in the presence of the reaction mixture (RM-1), obtaining a reaction mixture (RM-2),
    d) transferring the reaction mixture (RM-2) to a gas-phase reactor-1,
    e) in the gas-phase reactor-1 propylene and at least one comonomer selected from ethylene and a $C_4$-$C_{12}$ alpha olefin are polymerised, obtaining a reaction mixture (RM-3) comprising the crystalline propylene random copolymer (C-PP),
    f) transferring the reaction mixture (RM-3) to a gas-phase reactor-2,
    g) in the gas-phase reactor-2 propylene and at least one comonomer selected from ethylene and a $C_4$-$C_{12}$ alpha olefin are polymerised, obtaining a reaction mixture (RM-4) comprising the crystalline propylene random copolymer (C-PP) and the amorphous propylene copolymer (AM-PP), and
    h) recovering the polypropylene composition.

12. A process according to claim 11 having:
    a) a Ziegler Natta based catalyst comprising a group 2 metal and a group 6 metal containing catalyst which comprises an internal electron donor, triethylaluminium (TEAL) as co-catalyst and di-cyclopentyldimethoxy silane as external donor (donor D),
    b) a hydrogen/propylene ($H_2$/$C_3$) ratio in the loop reactor in the range of 0.1 to 0.4 mol/kmol,
    c) a hydrogen/propylene ($H_2$/$C_3$) ratio in the gas-phase reactor-1 in the range of 2.5 to 27.0 mol/kmol,
    d) a hydrogen/propylene ($H_2$/$C_3$) ratio in the gas-phase reactor-2 in the range of 60 to 270 mol/kmol,
    e) an ethylene/propylene ($C_2$/$C_3$) ratio in the loop reactor in the range of 0.0 to 25 mol/kmol,
    f) an ethylene/propylene ($C_2$/$C_3$) ratio in the gas-phase reactor-1 in the range of 25.0 to 50.0 mol/kmol, and
    g) an ethylene/propylene ($C_2$/$C_3$) ratio in the gas-phase reactor-2 in the range of 500 to 600 mol/kmol.

13. The polypropylene composition according to claim 1 further comprising at least one of: a polymer other than the crystalline propylene random copolymer (C-PP) and the amorphous propylene copolymer (AM-PP), a tackifying resin, a plasticizer, an additive or a filler, wherein the other polymer is chosen from the group consisting of high pressure polyethylene and co-polymers thereof, ethylene vinyl acetate (EVA) and ethylene acrylate co-polymers, low pressure polyethylene, styrene butadiene copolymer (SBC), styrene ethylene/butylene styrene (SEBS), polyolefin based plastomer (POP) and elastomers (POE), amorphous poly alpha olefin (APAO) and wax.

14. The polypropylene composition according to claim 13 comprising one or more of:
    a) at least 10.0 wt % of the polypropylene composition according to claim 1,
    b) a polymer other than the crystalline propylene random copolymer (C-PP) and the amorphous propylene copolymer (AM-PP) in the range of 0.0 to 50.0 wt %,
    c) a tackifying resin in a range of 0.0 to 70.0 wt %,
    d) a plasticizer in a range of 0.0 to 60.0 wt %,
    e) an additive in a range of 0.1 to 4.0 wt %,
    or
    f) a filler in a range of 0.0 to 50.0 wt %,
said weight percentages being calculated based on the total amount of the polypropylene composition components (a) to (f).

15. An article comprising the polypropylene composition according to claim 1.

16. The article according to claim 15, wherein the hot-tack film comprises at least one surface layer, the at least one surface layer comprising the polypropylene composition, the polypropylene composition exhibiting a hot tack force of at least 1.8 N.

17. The article according to claim 16 wherein the hot-tack film is a multilayer film having an overall thickness in the range of 30 to 500 µm, wherein the at least one surface layer has a thickness in the range of 3 to 50 µm, and wherein said multilayer film exhibits a hot tack force in the range of 1.8 to 6.0 N.

18. The article according to claim 15, wherein the article comprises an adhesive composition, and wherein the adhesive composition comprises one or more of:
    a) at least 10.0 wt % of the polypropylene composition,
    b) a polymer other than the crystalline propylene random copolymer (C-PP) and the amorphous propylene copolymer (AM-PP) in the range of 3.0 to 40.0 wt %,
    c) a tackifying resin in a range of 10.0 to 60.0 wt %,
    d) a plasticizer in a range of 3.0 to 55.0 wt %,
    e) an additive in a range of 0.15 to 3.0 wt %,
    or
    f) a filler in a range of 0.5 to 40.0 wt %,
said percentages being calculated based on the total amount of polypropylene composition components (a) to (f).

19. The article according to claim 15, wherein the article comprises a hot-tack film, and wherein the hot-tack film comprises:
    a) at least 90 wt % of a polypropylene composition consisting of crystalline propylene random copolymer (C-PP) and of amorphous propylene copolymer (AM-PP),
    and
    b) at least 0.1 wt % of additives, the additives comprising one or more of: antioxidants, slip agents, antiblocking agents or nucleating agents,
said percentages being calculated based on the total amount of polypropylene composition components including components (a) to (b).

20. The article according to claim 16, further comprising at least one substrate.

* * * * *